(12) United States Patent
Markezich

(10) Patent No.: US 6,448,310 B1
(45) Date of Patent: Sep. 10, 2002

(54) FLAME RETARDANT COMPOSITION

(75) Inventor: Ronald L. Markezich, Williamsville, NY (US)

(73) Assignee: Laurel Industries, Inc., Cleveland, OH (US)

(*) Notice: Subject to any disclaimer, the term of this patent is extended or adjusted under 35 U.S.C. 154(b) by 0 days.

(21) Appl. No.: 09/761,484

(22) Filed: Jan. 16, 2001

(51) Int. Cl.⁷ .............................. C08K 5/10; L08L 27/06
(52) U.S. Cl. ................. 523/351; 524/288; 524/296; 524/465; 524/469; 524/569; 525/239; 252/609
(58) Field of Search .................. 523/351; 524/288, 524/296, 465, 469, 569; 525/239; 252/609

(56) References Cited

U.S. PATENT DOCUMENTS

| | | | |
|---|---|---|---|
| 4,097,432 A | * 6/1978 | Nicholas et al. | 524/430 |
| 4,298,517 A | 11/1981 | Sandler | 260/31.8 HA |
| 4,397,977 A | 8/1983 | Sandler | 524/288 |
| 4,490,323 A | * 12/1984 | Thomson | 523/351 |
| 5,086,098 A | 2/1992 | Bohen et al. | 524/94 |
| 5,198,501 A | * 3/1993 | Bott et al. | 525/266 |
| 5,424,363 A | * 6/1995 | Nagata et al. | 525/85 |
| 5,516,814 A | * 5/1996 | Trotoir | 523/351 |
| 5,539,055 A | * 7/1996 | Nishimoto et al. | 525/239 |
| 5,824,241 A | 10/1998 | Horvat | 252/609 |
| 5,886,072 A | 3/1999 | Linsky et al. | 524/145 |
| 6,114,425 A | * 9/2000 | Day et al. | 524/288 |
| 6,232,427 B1 | * 5/2001 | Buono et al. | 528/147 |

OTHER PUBLICATIONS

Walter Michaeli—*Plastic Processing*, pp. 75–81, Carl Hanser Publishers, N.Y. 1995.*

* cited by examiner

*Primary Examiner*—Peter Szekely
(74) *Attorney, Agent, or Firm*—Richard D. Fuerle

(57) ABSTRACT

A method of making a dry, solid, powdered flame retardant composition is disclosed. Polyvinyl chloride is mixed with about 20 to about 150 phr of a liquid flame retardant having the general formula

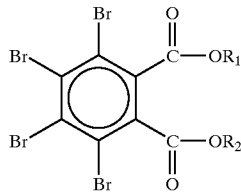

at a temperature of about 50 to about 100° C., where $R_1$ and $R_2$ are independently selected from aliphatic from $C_2$ to $C_{20}$. Also disclosed are a dry, solid, powdered flame retardant composition made by this method, a method of making a flame retardant polymer by compounding that dry, solid, powdered flame retardant composition with a polymer, and a flame retardant polymer made by that method.

20 Claims, No Drawings

FLAME RETARDANT COMPOSITION

BACKGROUND OF THE INVENTION

This invention relates to a method of converting a liquid flame retardant into a more easily handled powder. In particular, it relates to heating a mixture of a liquid tetrabromophthalate flame retardant and polyvinyl chloride (PVC) to produce a powdered flame retardant composition.

A flame retardant is often added to PVC and other resins to reduce the flammability of the resin so that the resin will pass industry flammability tests. A widely used flame retardant is di-2-ethylhexyl tetrabromophthalate (DEHTBP). While this flame retardant is very effective, it is a viscous liquid and cannot be easily handled without heating it to reduce its viscosity. This is an additional step in the manufacturing process and requires additional energy.

SUMMARY OF THE INVENTION

I have discovered that DEHTBP and similar liquid flame retardants can be converted from liquids into a free-flowing powders by mixing them with PVC and heating the mixture. The resulting flame retardant composition is easy to handle and can be added to a resin without additional heating. When the flame retardant composition is added to a polymer, it is as effective as the liquid flame retardant itself, and the properties of the resin are not adversely affected.

DESCRIPTION OF THE PREFERRED EMBODIMENTS

This invention is applicable to liquid flame retardants having the general formula

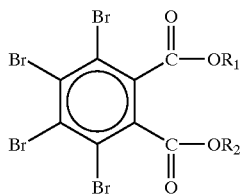

where $R_1$ and $R_2$ are independently selected from aliphatic from $C_2$ to $C_{20}$. Examples of $R_1$ and $R_2$ groups include ethylhexyl, octyl, nonyl, septyl, hexyl, decyl, and methylseptyl. Preferably, $R_1$ is the same as $R_2$ and they are branched or straight chain alkyl from $C_6$ to $C_{10}$ as those flame retardants are the best plasticizers. DEHTBP is most preferred because it is a commercial product.

To prepare the dry, solid, flame retardant, powdered composition of this invention, the liquid flame retardant is mixed with dry PVC powder. The PVC is preferably a homopolymer as homopolymers have better absorption, but it can also be a copolymer of vinyl chloride and up to 25 wt % of another compatible monomer, such as vinyl acetate. The PVC particle size can be from about 50 to about 300 microns; a preferred particle size is about 150 to about 200 microns. About 20 to about 150 phr (parts per hundred parts PVC by weight), and preferably about 70 to about 130 phr, of the flame retardant is mixed with the PVC. Less flame retardant is not very useful and it is hard to absorb more flame retardant onto the PVC.

Various optional components can be included in the mixture, such as about 0.1 to about 10 phr of a thermal stabilizer such as a tin compound, a cadmium compound or a barium/cadmium compound; about 5 to about 100 phr of a plasticizer, such as dioctyl phthalate (DOP); or about 1 to about 20 phr of a synergist such as antimony oxide.

The mixture is heated at between about 50 and about 100° C. At lower temperatures the liquid flame retardant does not absorb well onto the PVC and at higher temperatures the PVC may fuse (melt). A preferred temperature range is about 80 to about 100° C. The friction from the mixing usually supplies enough heat, though additional heating or cooling may be necessary. The mixing is preferably intense, in a high speed mixer, such as a Henschel mixer. When the torque of the mixer falls off, the mixing is usually finished. The resulting flame retardant composition has about the same particle size as the PVC powder used to make it.

The flame retardant composition can be added to a variety of polymers, including PVC, polyethylene, polypropylene, polystyrene, polystyrene foam, polyethylene vinyl acetate, polyethylene ethyl acetate, and ethylene propylene butadiene rubber; preferably, it is added to PVC or to polypropylene. The amount of flame retardant composition needed can be experimentally determined by adding increasing amounts to samples of the polymer until a sample passes whatever flammability test is being used. This might require only about 5 wt % in polystyrene foam, but as much as 100 wt % in polypropylene. In PVC, the amount of flame retardant composition is preferably about 20 to about 160 wt % as that is usually sufficient to pass a flammability test such as ASTM 02863.

The following examples further illustrate this invention:

EXAMPLE 1

50 lbs (22.7 kg) of a PVC resin (sold by Occidental Chemical Corp. as "Oxy 225") was added to a Henschel high speed mixer and stirred until the temperature reached 85 to 100° C. Then 50 lbs (22.7 kg) of liquid DEHTBP (sold by Occidental Chemical Corp. as "Pyronil®45") was added to the mixer. The mixture was stirred until it was a free flowing solid powder.

EXAMPLE 2

Three 5 lb (2.3 kg) samples were prepared by compounding "Oxy 225" PVC on a two roll mill at 180° C. with other components. The samples were cut into sheets and test bars were cut-out of the sheets. The test bars were subjected to limited oxygen index (LOI) flammability testing, an international standard test to measure the minimum concentration of oxygen in a oxygen/nitrogen atmosphere that is necessary to support a flame; the test measures the relative flammability of materials. The following table gives the materials used and the results:

| Material | Amount used (phr) | | |
| --- | --- | --- | --- |
| PVC resin | 100 | 90 | 100 |
| DOP | 20 | 20 | 20 |
| Liquid DEHTBP | 10 | — | — |
| Example 1 powder | — | 20 | — |
| $Sb_2O_3$ | 5 | 5 | — |
| Tin stabilizer | 3 | 3 | 3 |
| LOI Test Results | 33.5 | 34.1 | 27.8 |

EXAMPLE 3

A mixture was prepared of 95.5 wt % of a polypropylene homopolymer, 3 wt % of the PVC/DEHTBP solid powder of Example 1, 1.5 wt % antimony oxide, and 0.1 wt % of a barium zinc complex mixture (a thermal stabilizer sold by Ferro as "Therm-Chek 6274"). The mixture was extruded on a twin-screw extruder and the extruded material was chopped into pellets which were injection molded into test bars. An Underwriters Laboratory test (UL-94) gave the ⅛ inch (3.2 mm) and 1/16 inch (1.6 mm) thick bars a V-2 classification (i.e., not flammable). In the same test, but without the DEHTBP, the material with no flame-retardant additive burned and was classified as NC (i.e., flammable).

We claim:

1. A method of making a dry, solid, powdered, flame retardant composition comprising
    (A) forming a mixture that comprises
        (1) dry polyvinyl chloride powder; and
        (2) about 20 to about 150 phr of a liquid flame retardant having the general formula

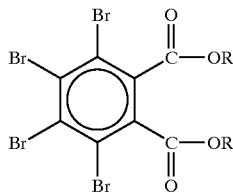

where $R_1$ and $R_2$ are independently selected from aliphatic from $C_2$ to $C_{20}$;
    (B) heating said mixture to a temperature of about 50 to about 100° C., whereby said polyvinyl chloride absorbs said liquid flame retardant but does not fuse; and
    (C) cooling said mixture to room temperature, whereby a dry, solid, powdered flame retardant composition is formed.

2. A method according to claim 1 wherein $R_1$ is the same as $R_2$.

3. A method according to claim 1 wherein $R_1$ and $R_2$ are independently selected from alkyl from $C_6$ to $C_{10}$.

4. A method according to claim 1 wherein said polyvinyl chloride is a homopolymer.

5. A method according to claim 1 wherein said polyvinyl chloride powder is a copolymer with up to about 25 wt % vinyl acetate.

6. A method according to claim 1 wherein said polyvinyl chloride has a particle size of about 50 to about 300 microns.

7. A method according to claim 1 wherein said mixing is performed on a high speed mixer.

8. A method according to claim 1 wherein said dry, solid, powdered, flame retardant composition includes up to about 10 phr of a thermal stabilizer, up to about 100 phr of a plasticizer, and up to about 20 phr of a synergist.

9. A dry, solid, powdered flame retardant composition made according to the method of claim 1.

10. A method of making a flame retardant polymer comprising compounding a dry, solid, powdered, flame retardant composition according to claim 9 with a polymer.

11. A method according to claim 10 wherein said polymer is selected from the group consisting of polyvinyl chloride, polyethylene, polypropylene, polystyrene, polystyrene foam, polyethylene vinyl acetate, polyethylene ethyl acetate, and ethylene propylene butadiene rubber.

12. A flame retardant polymer made according to the method of claim 10.

13. A method of making a dry, solid, powdered, flame retardant composition comprising
    (A) forming a mixture that comprises
        (1) dry polyvinyl chloride having a particle size of about 50 to about 300 microns; and
        (2) about 20 to about 150 phr of a liquid flame retardant having the general formula

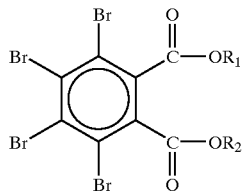

where R is alkyl from $C_6$ to $C_{10}$;
    (B) heating said mixture to a temperature of about 50 to about 100° C., whereby said polyvinyl chloride absorbs said liquid flame retardant but does not fuse; and
    (C) cooling said mixture to room temperature, whereby a dry, solid, powdered flame retardant composition is formed.

14. A method according to claim 13 wherein each R is 2-ethylhexyl.

15. A dry, solid, powdered, flame retardant composition made according to the method of claim 13.

16. A method of making a flame retardant polymer comprising adding about 5 to about 160 wt % of a dry, solid, powdered, flame retardant composition according to claim 15 to a polymer selected from the group consisting of polyvinyl chloride, polyethylene, polypropylene, polystyrene, polystyrene foam, polyethylene vinyl acetate, polyethylene ethyl acetate, and ethylene diene monomer.

17. A flame retardant polymer made according to the method of claim 16.

18. A method of making a dry, solid, powdered flame retardant composition comprising
    (A) forming a mixture that comprises
        (1) about 70 to about 130 phr liquid di-2-ethylhexyl tetrabromophthalate, and
        (2) dry polyvinyl chloride powder having a particle size of about 150 to about 200 microns;
    (B) heating said mixture to a temperature of about 80 to about 100° C.; and
    (C) cooling said mixture to room temperature, whereby a dry, solid, powdered flame retardant composition is formed.

19. A dry, solid, powdered flame retardant composition made according to the method of claim 18.

20. A method of making flame retardant polyvinyl chloride comprising adding about 20 to about 60 wt % of the dry, solid, powdered flame retardant composition of claim 19 to polyvinyl chloride.

* * * * *